United States Patent
Ehn, Jr.

(10) Patent No.: US 6,253,533 B1
(45) Date of Patent: Jul. 3, 2001

(54) LAWNMOWER REEL AND DRIVE MOTOR ASSEMBLY

(75) Inventor: Byron N. Ehn, Jr., Menomonee Falls, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/434,551

(22) Filed: Nov. 8, 1999

(51) Int. Cl.$^7$ .................................................. A01D 34/42
(52) U.S. Cl. ................................................ 56/249; 56/198
(58) Field of Search ................... 56/198, 249, 249.5, 56/DIG. 9, DIG. 11, DIG. 14; 403/315, 325, 252, 379.2, 379.6

(56) References Cited

U.S. PATENT DOCUMENTS

| | | | |
|---|---|---|---|
| 2,147,163 | * | 2/1939 | Jimerson ............................ 403/379.6 |
| 3,342,273 | * | 9/1967 | Crane ................................... 403/355 |
| 4,890,446 | * | 1/1990 | Israel ................................ 56/DIG. 9 |
| 4,947,080 | * | 8/1990 | Wood et al. .......................... 315/248 |
| 5,000,614 | * | 3/1991 | Walker et al. ........................ 403/379 |
| 5,059,844 | * | 10/1991 | Anstine ................................. 310/90 |
| 5,412,932 | | 5/1995 | Schueler ................................ 56/249 |
| 5,501,542 | * | 3/1996 | Hall, Sr. ............................... 403/379 |
| 5,522,669 | * | 6/1996 | Recker .................................. 403/325 |
| 5,553,445 | * | 9/1996 | Lamb et al. .............................. 56/7 |
| 5,775,074 | * | 7/1998 | Walter ............................... 56/DIG. 9 |
| 5,941,057 | | 8/1999 | Chesack ................................. 56/249 |

* cited by examiner

Primary Examiner—Thomas B. Will
Assistant Examiner—Nathan Mammen
(74) Attorney, Agent, or Firm—Arthur J. Hansmann

(57) ABSTRACT

A lawnmower reel and drive motor assembly with a mower frame and a reel and post supported by the frame. The motor has an opening which receives the post, and the motor is supported by the post in mounting the motor on the frame. The post has a slot therethrough, and a flat spring extends through the slot and abuts the motor and the post to thereby releasably hold the motor relative to the frame.

21 Claims, 4 Drawing Sheets

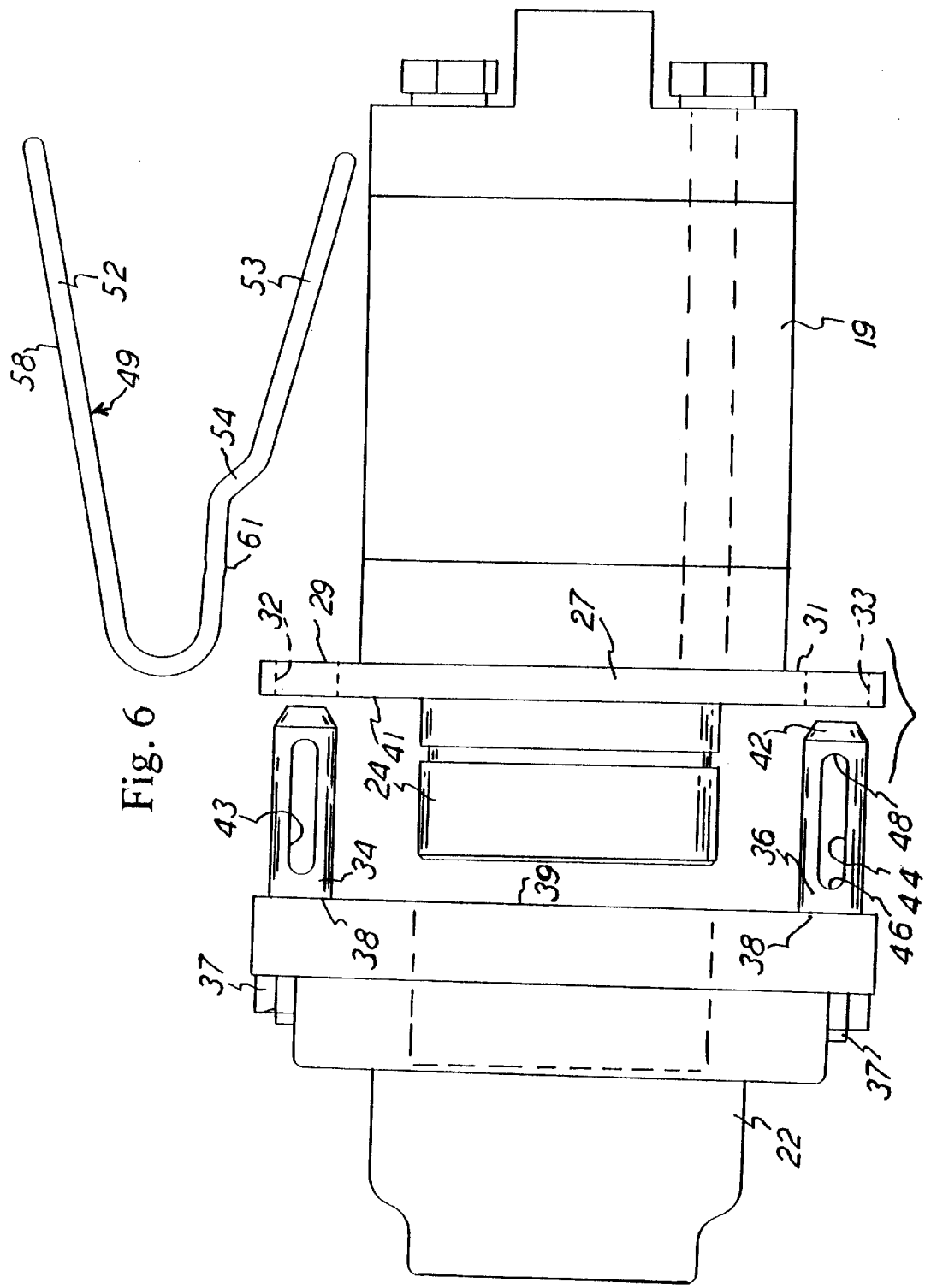

LAWNMOWER REEL AND DRIVE MOTOR ASSEMBLY

This invention relates to the lawn mower reel and drive motor assembly. More particularly, it relates to the mower reel and drive motor assembly wherein the motor can be quickly assembled and disassembled relative to the reel. It also relates to the method of the quick assembly and disassembly.

BACKGROUND OF THE INVENTION

The prior art is already aware of the problem of quickly assembling and disassembling a drive motor relative to a lawn mower reel. Examples of acknowledgment and solutions regarding the problem are seen in U.S. Pat. Nos. 5,412,932 and 5,941,057. In those instances, just as with regard to the present invention, the quick assembly and disassembly can be made without the need for working tools, and the drive motor can be quickly positioned and removed relative to the reel. However, those arrangements are different from the present invention in that they utilize several attaching parts which are not utilized nor required in the present invention.

Accordingly, the present invention provides for the quick assembly and disassembly of a drive motor relative to a lawn mower reel and to achieve that goal with only a minimum of parts and in an arrangement wherein the assembly and disassembly can be very quickly achieved. In actuality, the present invention requires only two parts, though they may be applied and are useful in duplicate. Further, the parts utilized in this invention are relatively inexpensive.

Still further, the assembly and disassembly is achieved without the utilization of tools and it is achieved in a very non-skilled and yet precise fashion. That is, there is no requirement for special attention to positioning of the part which ultimately holds the motor to the reel, and simple insertion of that part into a slot provided for receiving the part is all that is required for the assembly of the parts. Conversely, simple removal of the holding part from its inserted position is all that is required for removal of the drive motor from the reel, and the insertion and removal is achieved without the need for any threading action, tools, or any particular skill or close attention, and yet the motor is securely held in its accurate position with axial alignment with the rotation axis of the lawn mower reel.

BRIEF DESCRIPTION OF THE DRAWINGS

FIG. 5 is a top plan view of FIG. 4, with a part thereof removed.

FIG. 6 is a front elevational view of the invention part which is removed from FIG. 5 and is seen in FIG. 4.

DETAILED DESCRIPTION OF THE PREFERRED EMBODIMENT AND METHOD

The invention also includes a method of assembly and disassembly of the rotation drive motor relative to a lawn mower reel for quick and toolless accomplishment. Again, with regard to the distinguishing aspects of this invention, the method is achieved by means of manipulation of only one part which secures the motor relative to the mower, and that is achieved through a simple movement of the one part, and that is all that is required.

The drawings included herein show the physical construction which incorporates the invention, and, in this description, the method is also inherently disclosed.

Figure 2:
FIGS. 1 and 2 are front and top views, respectively, of a lawnmower reel and drive motor with this invention applied thereto.
Figure 1:
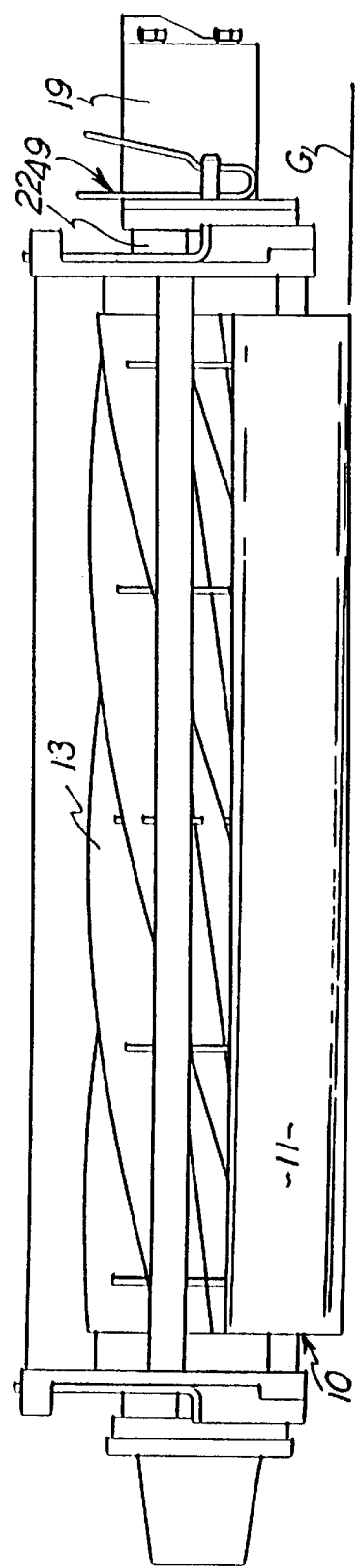

FIGS. 1 and 2 show a conventional reel-type lawnmower 10. There is the usual reel mower front roller 11 and rear roller 72, both of which support the mower on the ground line designated "G". Also, the mower 10 includes the usual reel 13 which rotates about the usual reel shaft 14 rotatable on its axis 16. The mower 10 also includes side frame pieces 17 and 18 which present the support for the rotating reel 13, all in the usual manner, such as shown in the aforecited two patents.

A rotation drive motor 19 is supported relative to the frame 17 and has a rotation drive axis 21 which is co-axial with the mower reel axis 16. In that general arrangement, the usual motor 19 is in driving relationship with the reel 13 for rotating the reel in its mowing function.

The present invention involves the quick assembly and disassembly of the motor 19 relative to the mower itself, which includes the frame 17, and, as shown, the motor 19 is disposed to one axial extent of the mower reel 13 and thus to one side of the mower 10, as displayed.

The usual arrangement is such that there is a bearing housing 22 suitably mounted on the mower frame piece 17, such as by bolts which are not shown in these drawings. The housing 22 presents a cylindrical cavity 23, and the motor 19 has a cylindrical projection 24 which is shown snugly received within the cavity 23, and thus the motor 19 can be piloted and thereby positioned co-axially relative to the reel 13. It will of course be understood that there is suitable rotation drive connection between the motor 19 and the reel 13, for rotating of the latter in the usual manner. Also, it will be understood that there is suitable and usual power connections, such as hydraulic lines, connected to the motor 19 for powering the motor 19 in the usual manner.

The motor 19 includes its main body portion 26, and it has a flange portion 27 which projects radially beyond the body portion 26. Screws 28 extend through the motor 19 and secure together the body portion 26 and the flange 27. The details of that assembly need not be further described herein. As seen in FIG. 5, the flange 27 presents surfaces 29 and 31 which are on one common plane perpendicular to the axes 16 and 21. Also, the flange 27 has two holes 32 and 33 extending therethrough.

The rotation bearing member 22, which is attached to the reel frame 17, has two pins or posts 34 and 36 connected thereto and secured thereto by means of nuts 37. Both posts 34 and 36 have shoulders 38 which bear against the planar surface 39 of the member 22. As such, the posts 34 and 36 are securely mounted on the member 22, and they are therefore secure with the mower frame itself. Particularly in viewing FIGS. 4 and 5, it will be seen that the posts 34 and 36 respectively extend through the openings 32 and 33 on the flange 27, and thus the planar surface 39 is in full contact with a planar surface 41 of the flange 27 when in the assembled position of FIG. 4.

In that assembled position, the motor 19 can be piloted relative to the reel 13 by means of the two diametrically opposite posts 34 and 36 which are extending parallel to the longitudinal axes 16 and 21. Therefore, the motor 19 can be automatically properly axially aligned with the reel 13 and is retained in that alignment. Thus the posts 34 and 36 are received by those respective circular openings 32 and 33, and of course the posts 34 and 36 are cylindrical and extend longitudinally parallel to the axes 16 and 21. The posts 34 and 36 both have tapered ends 42 for facilitating mounting of the motor 19 onto the posts 34 and 36, as mentioned, and those posts are support members for the motor.

FIG. 5 also shows that the posts 34 and 36 have elongated slots 43 and 44, respectively, extending along the length of the respective posts and for substantially the length of the posts. The thickness of the flange 27, as particularly viewed in FIG. 5, is greater than the distance from the planar surface 39 to the base 46 of the slots 43 and 44. That is, the post shoulders 38 position the posts 34 and 36 such that the flange 27 extends over the post slots 43 and 44 in the assembled position, and FIG. 4 shows that overlap at 47.

Also, the post slots 43 and 44 have distal terminal edges 48, and it will be understood that the slots 43 and 44 are extending in the length of what can be designated the extending portions of the respective posts 34 and 36.

Figure 3:
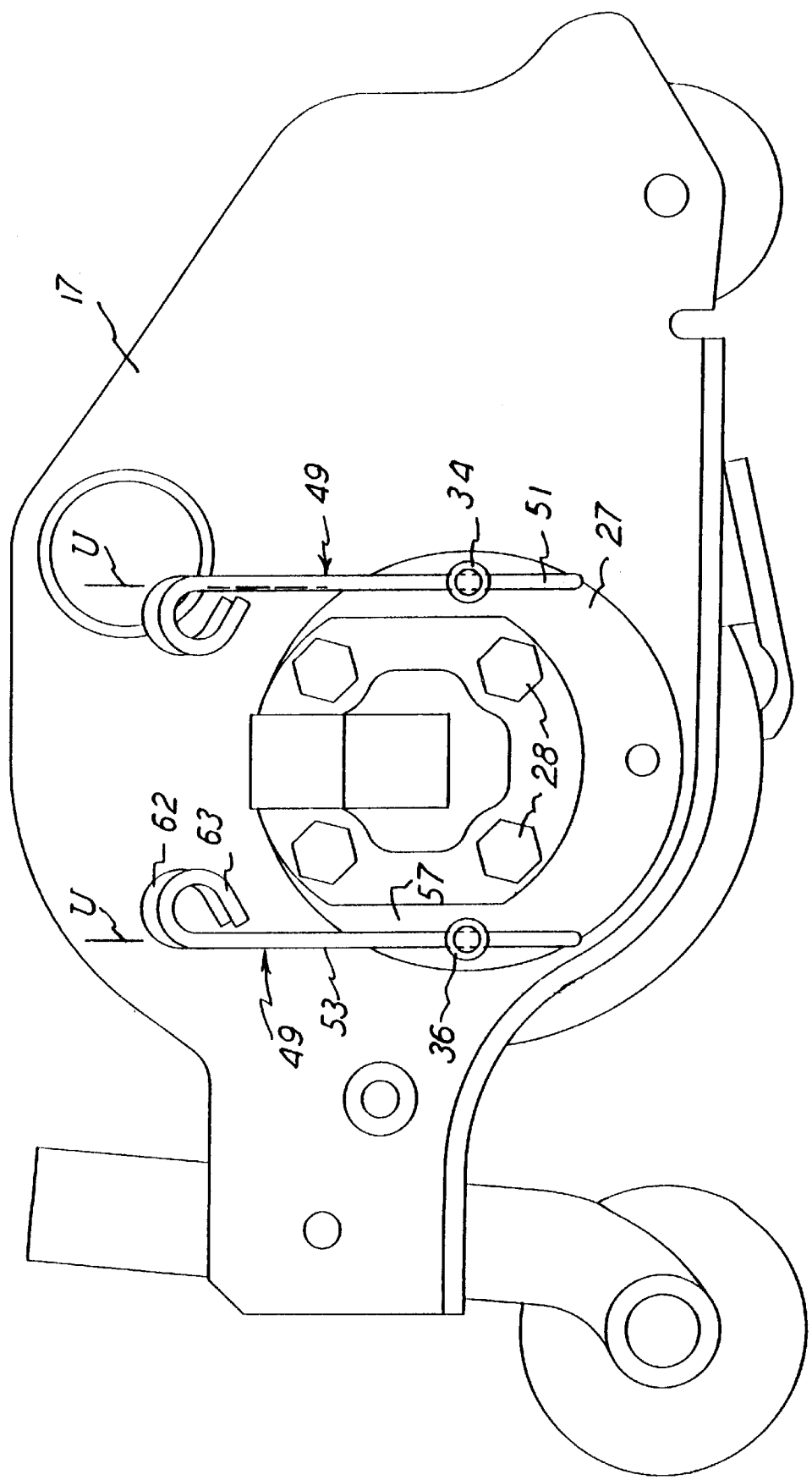
FIG. 3 is an enlarged right side elevational view of FIG. 1.
Figure 4:
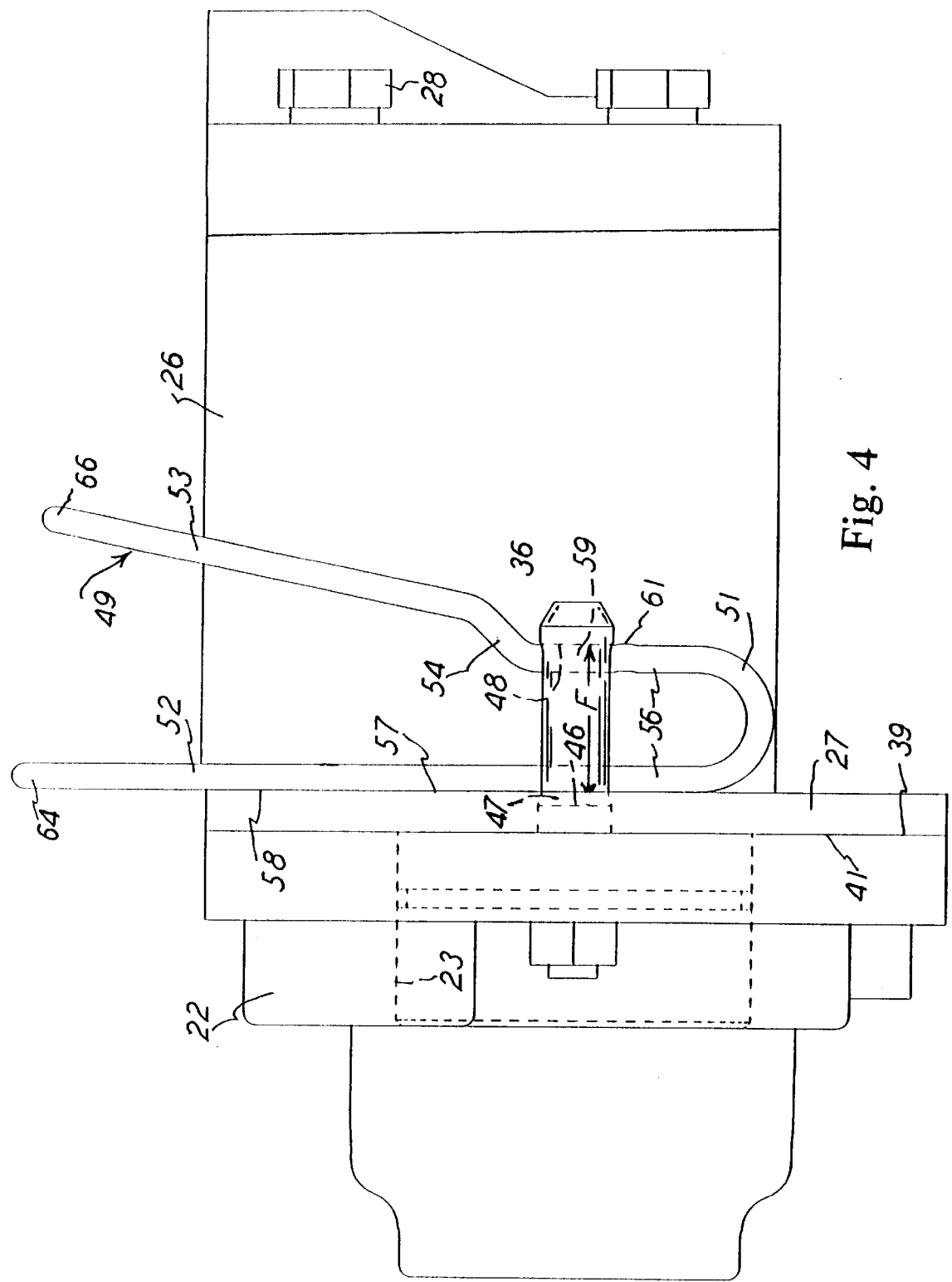
FIG. 4 is a front elevational view of a portion of FIG. 3.

When the motor 19 is assembled with the mower itself, as described and as shown in FIG. 4, then a spring, generally designated 49, is inserted into the slot in each post 34 and 36 such as seen in FIG. 4. The spring 49 is termed a flat spring made of a music wire and having sufficient spring strength to serve the purpose herein being described. The spring 49 is U-shaped, as seen in FIGS. 4 and 6, and it has the curved U-shape at 51 and the two extending legs 52 and 53, and the entire spring 49 is made of spring wire of round cross-section stock formed into the U-shape just described. There is an offset portion at 54, and below that portion is what is termed the U-shape 51, and it is that U-shape 51 which is inserted into the post slots described. The springs have their U-shape lying along respective planes U which are parallel to the axes 16 and 21, as the planes U are seen in FIG. 3.

The spring is biased to have its legs 52 and 53 move away from each other, and thus, in the FIG. 4 condition, the spring is under compression while the lengths 56 of the U-shape 51 are parallel, or at least substantially so, to each other and are retained in that position by virtue of bearing against the flat surface 57 on the flange 27, and that surface 57 extends perpendicular to the axes 16 and 21. Thus, the surface 58 of the spring leg 52 extends completely along and in forceful abutment with the flange surface 57. The spring portion 56 and its length designated 59 which is within the post slot 44, bears against the slot end surface 48 of the post 36. As such, the spring 49 forces in the two opposite directions parallel to the axes 16 and 21 to thereby securely hold the motor 19 on the mower reel. Of course it will be seen and has been described that there can be two posts 34 and 36 for the releasable securing of the motor on the reel.

FIGS. 4 and 6 also show that the spring 49 has an offset portion 61 along its U-shaped length 56, and that portion 61 is an interference fit relative to the respective post such that the spring 49 cannot move upwardly relative to the respective post without the collapsing of the spring by moving its legs 52 and 53 toward each other for clearance of the U-shape 51 from the respective post slot.

FIG. 3 shows that the spring legs 52 and 53 terminate in arcuate portions 62 and 63 respectively, and these portions 62 and 63 are finger pads so that the operator can place his fingers on the pads 62 and 63 and move them toward each other and thereby compress the spring 49 to where it can either be inserted or removed relative to the respective post slots.

Thus, the pads 62 and 63 present leg ends designated 64 and 66, respectively, and those pads are on a plane transverse to the longitudinal axes mentioned, and thus transverse to the direction of the spring bias for the spring 49. Still further, the upper ends, such as at the pads 62 and 63 are well above and away from the motor 19 and are therefore accessible for the operator to grasp and squeeze for slipping the respective spring 49 into and out of its respective post slot.

It will also be seen, such as in FIG. 4, that the greater length of the spring 49 extends upwardly above the post 36, and thus at the upper ends 64 and 66 there is substantial mechanical advantage when the operator finger-squeezes at the pads 62 and 63 to thereby insert or release the spring 49 relative to either post. However, the force of the spring 49 along the surface 57 is sufficiently great to securely hold the motor 19 in the operative position shown herein.

The arrangement and method are such that the springs 49 extend along and on a respective plane P parallel to the axes 16 and 21. One side of the spring 49 urges against the support or post 36 while the opposite side of the spring 49 urges against the motor support surface 57. Thus one portion or leg of the spring 49 exerts a force F on the post and in the direction away from the reel, and the other or leg of the spring 49 exerts a force F on the motor and toward the reel. The force F is exerted in opposite directions and along the plane P, and it is commonly a fifty pound force, though the operator's finger force to flex the spring legs 52 and 53 toward each other is much less than the applied holding mentioned. That applied holding is achieved by virtue of the alignments shown and described herein, and also because the length of the slots in the posts is sufficiently great so that the spring leg 52 can bear against the surface 57 and not be restricted by the base 46 of the slots 43 and 44.

Also, upon insertion of the springs 49 into their respective slots 43 and 44, the spring offset 54 serves as a stop and guide as for the penetration of the springs into their slots, and that is by the interference from the posts during the lowering of the springs into their slots while the springs are slightly flexed to have their legs disposed toward and closer to each other than the spacing to the slot ends 48.

As mentioned at the outset, the method for the assembly and disassembly of the driving motor relative to the reel has been disclosed herein, particularly with application of the spring disposed within the slots of the mounting posts.

The distance from the shoulder 38 to the slot base 46 is less that the thickness of the flange 27 which is the distance from the wall 39 to the wall 57. Also, the spring presents one straight leg 52, for the motor holding force along the surface 58, and one offset leg 53 which assures proper spring orientation for insertion into the slot. Also, leg lengths 56 may be parallel to each other in the inserted FIG. 4 position.

In addition to, or alternative to, the piloting of the motor 19 in the cavity 23, the posts 34 and 36 can be dimensioned in their cross section substantially the same as that of the openings 32 and 33 to thereby be mated with their respective openings 32 and 33 to be snug throughout their cross sectional shapes in those openings. That is, the posts 34 and 36 can serve as pilot fittings between the mower 10 and the motor 19 to thereby align the axes 16 and 21. Also as shown, such as in FIG. 3, the two openings 32 and 33 and the posts 34 and 36 are all disposed on one common horizontal plan and are on respective diametrically opposite sides of the axes 16 and 21.

What is claimed is:
1. A lawnmower reel and drive motor assembly comprising
   a mower frame for movement over ground,
   a lawnmower reel having an elongated shaft extending therealong and having a longitudinal axis which is horizontally disposed and with said shaft being rotatably supported on said frame for rotation about said axis, a rotatable reel drive motor supported on said frame and being disposed at one elongated end of said shaft and having an axis aligned with said reel axis and being in rotation driving relation with said reel and having a surface extending along a plane intersecting said axis of said motor and being faced away from said reel, a support member connected with said frame and having an extending portion extending past said motor surface in a direction away from said reel, and a flat spring extending and having two portions spaced apart along a plane parallel to said axis of said motor and being arranged and disposed to be spring-urged away from each other along said plane and with one of said two portions being disposed in contact with said support extending portion to exert a spring force along said plane on said support extending portion in the direction away from said reel and the other of said two portions being disposed in contact with said surface to exert a spring force along said plane on said surface in a direction toward said reel to hold said motor in a position relative to said frame.

2. The lawnmower reel and drive motor assembly as claimed in claim 1, wherein said spring is U-shaped and has two legs, and with said two legs constituting said two portions.

3. The lawnmower reel and drive motor assembly as claimed in claim 1, including an additional support member to thereby present, along with said first-mentioned support member, two said support members, said supports members being disposed on respective horizontally diametrically opposite sides of said reel axis, and there being one said spring for each respective one of said support members.

4. The lawnmower reel and drive motor assembly as claimed in claim 1, wherein said spring two portions extend upwardly more than downwardly from said support member to thereby facilitate the maneuvering of said spring by the operator.

5. The lawnmower reel and drive motor assembly as claimed in claim 1, wherein, said support member extending portion has a slot extending therealong in said direction, and said spring is disposed in said slot and extends therefrom.

6. The lawnmower reel and drive motor assembly as claimed in claim 5, wherein said spring is U-shaped and has two legs, and with said two legs constituting said two portions, and said spring has an intermediate portion extending between and interconnecting said two legs, and with said intermediate portion being disposed in said slot and extending beyond said support member.

7. The lawnmower reel and drive motor assembly as claimed in claim 6, wherein said plane is disposed to be upright, said slot extends through said support member on the upright plane, and said spring is disposed to have the U-shape thereof extend along the upright plane.

8. The lawnmower reel and drive motor assembly as claimed in claim 7 including said spring has an offset portion adjacent said support member and disposed to contact said support member in response to upward movement of said spring relative to said support member, and thereby prevent movement of said spring upwardly and out of said slot.

9. The lawnmower reel and drive motor assembly as claimed in claim 7, wherein said two legs each extend for a length greater than the extent of the U-shape, and thereby present said legs for gripping and movement in an arrangement of leveraged force by virtue of gripping said legs and thereby forcing said legs toward each other along said plane.

10. The lawnmower reel and drive motor assembly as claimed in claim 7, including said two legs each having a finger pad thereon for gripping by fingers of the operator for squeezing said legs toward each other.

11. The lawnmower reel and drive motor assembly as claimed in claim. 10, wherein said pad on each of said legs has an operator's finger pressure surface extending transverse to said upright plane, for receiving the operator's finger for the squeezing of said legs toward each other along said plane.

12. A lawnmower reel and drive motor assembly comprising a mower frame for movement over ground, a lawnmower reel having an elongated shaft extending therealong and having a longitudinal axis which is horizontally disposed and with said shaft being rotatably supported on said frame for rotation about said axis, a rotation reel drive motor supported on said frame and being disposed at one elongated end of said shaft and having an axis aligned with said reel axis and being in rotation driving relation with said reel and having a surface extending along a plane intersecting said axis of said motor and being faced away from said reel and having an opening extending through said surface, a support post connected with said frame and having an extending portion extending through said opening and past said motor surface in a direction away from said reel and having a slot therein extending along a plane parallel to said reel axis, and a flat spring disposed in said slot and extending and having two portions spaced apart along said plane and being arranged and disposed to be spring-urged away from each other along said plane and with one of said two portions being disposed in contact with said support extending portion to exert a spring force along said plane on said support extending portion in the direction away from said reel and the other of said two portions being disposed in contact with said surface to exert a spring force along said plane on said surface in a direction toward said reel to hold said motor in a position relative to said frame.

13. The lawnmower reel and drive motor assembly as claimed in claim 12, wherein said spring is U-shaped and has two legs, and with said two legs constituting said two portions, and said spring has an intermediate portion extending between and interconnecting said two legs, and with said intermediate portion being disposed in said slot.

14. The lawnmower reel and drive motor assembly as claimed in claim 13, including said two legs each having a finger pad thereon for gripping by fingers of an operator for squeezing said legs toward each other.

15. In a method of mounting a rotation drive motor on a lawnmower reel for quick and toolless assembly and disassembly of the driving motor relative to the lawnmower reel which has a longitudinal axis of rotation, the improvement comprising the steps of providing a lawnmower reel with a mounting post extending in a plane parallel to said axis and having a slot in said post, positioning said driving motor in rotation driving relation to said reel and providing a surface on said motor surrounding said post and leaving said slot exposed, inserting a spring into said slot in a position and arrangement to have said spring exert two oppositely directed forces with one of said forces being exerted on said surface and the other of said forces being exerted on said post, with all being arranged to thereby releasably hold said motor on said reel for quick and toolless removal of said spring from said post and consequent removal of said motor from said reel.

16. An assembly for a motor-powered lawn mower reel comprising a mower reel frame, a mower reel rotatably mounted on said frame and having a longitudinal axis, a motor supported on said frame and being disposed on said axis and in rotational drive relationship with said reel for rotating said reel in mowing action, and a one-piece spring supported relative to said frame and having a portion extending into contact with said motor and with said portion spring-urging in a direction parallel to said axis for spring-holding said motor in position relative to said frame and against movement in the direction parallel to said axis.

17. The assembly for a motor-powered lawn mower reel as claimed in claim 16, wherein said portion consists of an extension lying along a flat plane and extends to a location to overlap said motor along a direction transverse to said axis.

18. An assembly for a motor-powered lawn mower reel comprising a mowing reel having a shaft presenting a rotation axis, a rotation support disposed on said axis at one end of said shaft and engaged with said shaft for rotatably supporting said reel on said axis, a motor supported by said rotation support and having a surface faced in a direction away from said reel and being drivingly engaged with said reel for rotating said reel about said axis, and a spring supported by said rotation support and including an extending portion disposed to overlap said surface of said motor, and with said portion, in said assembly, being forceful in a direction opposite said first-mentioned direction and thereby releasably hold said motor against movement of said motor away from said rotation support.

19. The assembly for a motor-powered lawn mower reel as claimed in claim 18, wherein said spring is U-shaped and has two legs thereon, and one of said legs is disposed to hold said motor and constitutes said extending portion.

20. A method for quickly attaching and releasing a motor relative to a lawnmower which has a cutting reel and a support for the reel, comprising the steps of assembling said reel and said support together and with both thereof having an axis disposed and extending along a common axial line, assembling said motor with said support adjacent said support in a position offset from said support in a direction along said line and piloting said motor relative to said support for uprightly holding said motor, attaching a spring relative to said support and with said spring having a portion extending thereon, disposing said portion in contact with said motor for exerting a spring force on said motor in a holding direction along said line opposite the first-mentioned said direction, for holding said motor relative to said support and in said holding direction along said line, and relieving the spring force on said motor, for releasing said motor relative to said support in said holding direction.

21. The method of quickly attaching and releasing a motor relative to a lawnmower, as claimed in claim 20, including the steps of disposing said spring in a U-shape to have two legs, disposing one of said legs releasably attached relative to said support, and disposing the other of said legs on said motor.

\* \* \* \* \*